(12) United States Patent
Minobe

(10) Patent No.: US 8,620,101 B2
(45) Date of Patent: Dec. 31, 2013

(54) IMAGE QUALITY DISPLAY CONTROL APPARATUS AND METHOD FOR SYNTHESIZED IMAGE DATA

(75) Inventor: Miyako Minobe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1260 days.

(21) Appl. No.: 12/469,392

(22) Filed: May 20, 2009

(65) Prior Publication Data

US 2009/0303263 A1 Dec. 10, 2009

(30) Foreign Application Priority Data

Jun. 10, 2008 (JP) ................................ 2008-152254

(51) Int. Cl.
*G06K 9/40* (2006.01)
(52) U.S. Cl.
USPC ............................ 382/274; 382/254; 345/690
(58) Field of Classification Search
USPC .................................................. 382/254, 274
See application file for complete search history.

(56) References Cited

U.S. PATENT DOCUMENTS

| | | | | | |
|---|---|---|---|---|---|
| 4,987,412 | A * | 1/1991 | Vaitekunas et al. | ........... | 345/635 |
| 5,144,438 | A * | 9/1992 | Kim | ................. | 725/56 |
| 5,250,933 | A * | 10/1993 | Beaudin et al. | ............... | 345/635 |
| 5,856,821 | A * | 1/1999 | Funahashi | ..................... | 345/667 |
| 5,889,517 | A * | 3/1999 | Ueda et al. | ....................... | 715/803 |
| 5,940,089 | A * | 8/1999 | Dilliplane et al. | ............ | 345/553 |
| 6,069,662 | A * | 5/2000 | Horiuchi et al. | ............... | 348/446 |
| 6,208,354 | B1 * | 3/2001 | Porter | ........................... | 345/634 |
| 6,538,675 | B2 * | 3/2003 | Aratani et al. | ................ | 715/856 |
| 6,727,909 | B1 * | 4/2004 | Matsumura et al. | .......... | 345/629 |
| 6,898,327 | B1 * | 5/2005 | Hrusecky et al. | ............. | 382/260 |
| 7,148,909 | B2 * | 12/2006 | Yui et al. | ........................ | 345/660 |
| 7,656,543 | B2 * | 2/2010 | Atkins | ........................ | 358/1.13 |
| 7,743,322 | B2 * | 6/2010 | Atkins | .......................... | 715/243 |
| 7,768,681 | B2 * | 8/2010 | Kuwata | ......................... | 358/518 |
| 7,876,382 | B2 * | 1/2011 | Imaizumi | ..................... | 348/565 |
| 8,065,627 | B2 * | 11/2011 | Atkins | .......................... | 715/788 |
| 8,072,544 | B2 * | 12/2011 | Fukuda et al. | ................ | 348/581 |
| 8,212,797 | B2 * | 7/2012 | Inokawa | ........................ | 345/204 |
| 2002/0175924 | A1 * | 11/2002 | Yui et al. | ........................ | 345/660 |
| 2002/0186212 | A1 * | 12/2002 | Matsumoto et al. | .......... | 345/204 |
| 2005/0047678 | A1 * | 3/2005 | Jones et al. | .................... | 382/294 |
| 2007/0248240 | A1 * | 10/2007 | Epstein | ......................... | 382/100 |
| 2009/0303263 | A1 * | 12/2009 | Minobe | ......................... | 345/690 |

FOREIGN PATENT DOCUMENTS

| | | |
|---|---|---|
| JP | 2001-013940 | 1/2001 |
| JP | 2003-348488 | 12/2003 |
| JP | 2006-157222 | 6/2006 |

* cited by examiner

*Primary Examiner* — Gandhi Thirugnanam
(74) *Attorney, Agent, or Firm* — Cowan, Liebowitz & Latman, P.C.

(57) ABSTRACT

A display control apparatus includes a synthesizing unit for synthesizing multiple pieces of image data to generate synthesized image data; an image quality adjustment unit for carrying out image quality adjustment for the synthesized image data output from the synthesizing unit; a format discrimination unit for discriminating a format of each of the multiple pieces of image data; a determination unit for determining referenced image data for the image quality adjustment from the multiple pieces of image data based on discrimination results from the format discrimination unit; and a control unit for controlling the image quality adjustment unit so as to carry out the image quality adjustment for the synthesized image data using a parameter suitable for image quality adjustment of the referenced image data for the image quality adjustment determined by the determination unit.

8 Claims, 3 Drawing Sheets

IMAGE QUALITY DISPLAY CONTROL APPARATUS AND METHOD FOR SYNTHESIZED IMAGE DATA

BACKGROUND OF THE INVENTION

1. Field of the Invention

The present invention relates to a display control apparatus and a display control method, and more particularly, to a display control apparatus and a display control method which are preferred for use in a video display apparatus which is able to simultaneously display multiple videos on one screen.

2. Description of the Related Art

Recently, image quality adjustment functions for higher image qualities, such as a noise reduction function, a gamma correction function, and a color tone correction function, have been mounted for many video display apparatuses such as TV receivers. In order to adjust individual parameters appropriately for these functions, a relatively sophisticated understanding of image characteristics is required. Therefore, it is common to preset, at shipping, some sets of parameters in accordance with the genre of video content or the like. The user can obtain videos with image qualities in accordance with purposes of watching, by a simple operation of selecting a set of preset parameters.

As one of such sets of parameters, there is a dynamic mode. In the dynamic mode, each parameter is adaptively varied in response to the characteristics of a video being displayed. As one example, when a video has high brightness over the entire screen, it is conceivable to set parameters so as to reduce the brightness and decrease the gamma correction value. Alternatively, when a video is dark with low brightness over the entire screen, it is conceivable to set parameters so as to increase the gamma correction value and enhance the contrast, and further to increase the color saturation. Adaptively carrying out such parameter control depending on video display allows the user to watch even videos which vary significantly in brightness or color shade in a time series manner, always at easily viewable image quality.

Furthermore, recent TV receivers primarily include models including a plurality of external input terminals for inputting moving image data or still image data. Some of such models allow videos of moving image data or still image data output from external devices connected to the plurality of external input terminals to be displayed simultaneously. For example, zooming is carried out, if necessary, for each piece of moving image data or still image data supplied from the plurality of external image input terminals, and the pieces of data are arranged in predetermined positions to be synthesized in one frame and displayed on a screen.

Now, consider a case of executing the dynamic mode described above and displaying a plurality of videos and images simultaneously on one screen. As one example, it is assumed that a video A (a video mainly including a person under illumination) and a video B (a video including a night view) which are completely different in terms of content are to be simultaneously displayed on one screen. In a case in which the dynamic mode is executed for this screen, image quality adjustment in accordance with the dynamic mode will be carried out for the entire screen including the video A and the video B. More specifically, the image quality adjustment carried out at this point is not specified for the video A or the video B. Therefore, there is a possibility that this image quality adjustment is not suitable for either the video A or the video B.

Japanese Patent Laid-Open No. 2003-348488 discloses a technique for exercising luminance control for display on the basis of luminance information of an image source rendered in the largest size, in the case of displaying multiple videos or images of a main video or image and a secondary video or image. According to Japanese Patent Laid-Open No. 2003-348488, the technique is useful in a case in which the video or image watched by the user with attention is the largest video or image of the multiple videos or images.

However, the technique described in Japanese Patent Laid-Open No. 2003-348488 has problems as described below.

Japanese Patent Laid-Open No. 2003-348488 is useful if the user watches with attention the video or image with the largest display size out of multiple screens displayed on one screen as described above. However, the user does not necessarily watch with attention the video or image with the largest display size, and this case has a problem in that there is a possibility that image quality adjustment expected by the user will not be carried out. For example, in a case in which the original display size of the video or image to be watched with attention is smaller than the other video(s) or image(s), the video or image will not be a target of image quality adjustment in accordance with the dynamic mode.

SUMMARY OF THE INVENTION

The present invention has been made in consideration of the above situation, and provides a display control apparatus and a display control method which are able to more flexibly determine a referenced image for image quality adjustment, in a case in which image quality adjustment is adaptively carried out for a screen on which multiple images are simultaneously displayed.

According to the present invention, a display control apparatus comprises: a synthesizing unit configured to synthesize multiple pieces of image data to generate synthesized image data; an image quality adjustment unit configured to carry out image quality adjustment for the synthesized image data output from the synthesizing unit; a format discrimination unit configured to discriminate a format of each of the multiple pieces of image data; a determination unit configured to determine referenced image data for the image quality adjustment among the multiple pieces of image data based on discrimination results in the format discrimination unit; and a control unit configured to control the image quality adjustment unit so as to carry out the image quality adjustment for the synthesized image data using an image quality adjustment parameter suitable for the referenced image data determined by the determination unit.

Further, according to the present invention, a display control method comprises: a synthesizing step of synthesizing multiple pieces of image data to generate synthesized image data; an image quality adjustment step of carrying out image quality adjustment for the synthesized image data; a format discrimination step of discriminating a format of each of the multiple pieces of image data; a determination step of determining referenced image data for the image quality adjustment among the multiple pieces of image data based on discrimination results in the format discrimination step; and a control step of controlling the image quality adjustment so as to carry out the image quality adjustment for the synthesized image data using an image quality adjustment parameter suitable for the referenced image data determined in the determination step.

Further, according to the present invention, a display control apparatus comprises: a synthesizing unit configured to synthesize multiple pieces of image data to generate synthesized image data; an image quality adjustment unit configured to carry out image quality adjustment for the synthesized image data output from the synthesizing unit; an input port discrimination unit configured to discriminate an input port of each of the multiple pieces of image data; a determination unit configured to determine referenced image data for the image quality adjustment among the multiple pieces of image data based on discrimination results in the input port discrimination unit; and a control unit configured to control the image quality adjustment unit so as to carry out the image quality adjustment for the synthesized image data using an image quality adjustment parameter suitable for the referenced image data determined by the determination unit.

Furthermore, according to the present invention, a display control method comprises: a synthesizing step of synthesizing multiple pieces of image data to generate synthesized image data; an image quality adjustment step of carrying out image quality adjustment for the synthesized image data; an input port discrimination step of discriminating an input port of each of the multiple pieces of image data; a determination step of determining referenced image data for the image quality adjustment among the multiple pieces of image data based on discrimination results in the input port discrimination step; and a control step of controlling the image quality adjustment so as to carry out the image quality adjustment for the synthesized image data using an image quality adjustment parameter suitable for the referenced image data determined in the determination step.

Further, features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

Figure 1:
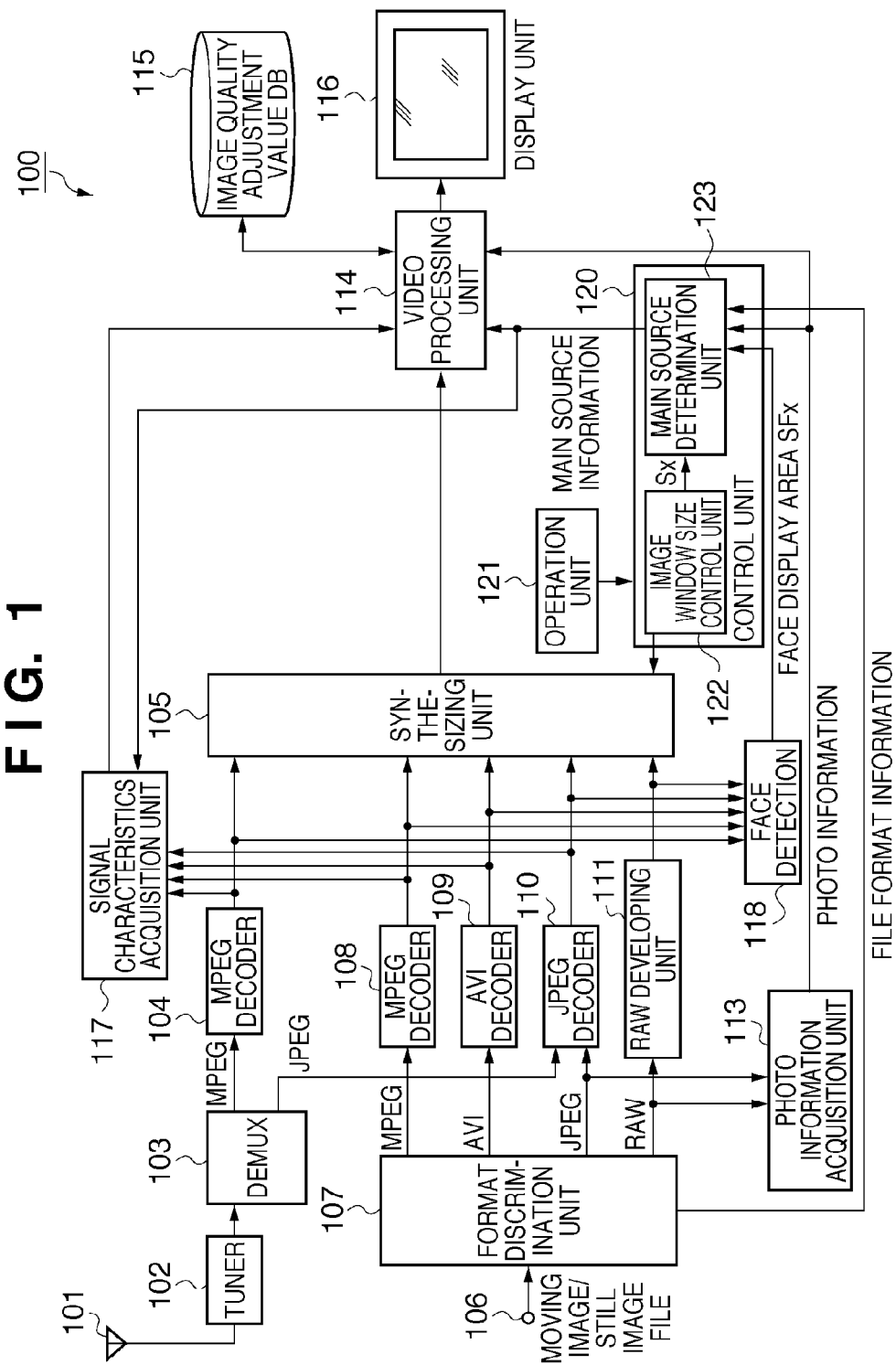
FIG. 1 is a block diagram illustrating the configuration of an example of a video display apparatus to which an embodiment of the present invention is applicable.

FIG. 1 shows the configuration of an example of a video display apparatus 100 to which an embodiment of the present invention is applicable. In the example of FIG. 1, the video display apparatus 100 is a TV receiver in which videos received by an antenna 101 via TV broadcasting are displayed on the display unit 116. This video display apparatus 100 can receive, as files, moving image data or still image data generated in external devices, and display the data on the display unit 116. In this case, the video display apparatus 100 allows display control in such a way that multiple images from the multiple files are arranged and displayed simultaneously on one screen.

It is to be noted that, hereinafter, unless otherwise noted, moving image data or still image data is referred to as image data, whereas a moving image or still image file for storing moving image data or still image data is referred to as an image file.

A control unit 120 is composed of, for example, a CPU, a RAM, a ROM, etc., and controls the entire video display apparatus 100 with the use of a RAM as a working memory in accordance with a program stored in the ROM in advance. An operation unit 121 is provided with multiple manipulators for accepting user's operations, and outputs a control signal depending on the accepted operation. The control signal is supplied to the control unit 120. The control unit 120 transmits commands or the like to each unit of the video display apparatus 100, depending on the control signal, and controls the video display apparatus 100 so as to operate in response to the user's operation.

While the foregoing example has been described in terms of the video display apparatus 100 being provided directly with the manipulators of the operation unit 121, the configuration is not limited to this example. For example, the operation unit 121 may be composed of, for example, a remote control commander for modulating a control signal in response to an operation to a manipulator into an infrared signal and transmitting the infrared signal, and a receiving unit for receiving and demodulating the infrared signal.

Furthermore, the control unit 120 has an image window size control unit 122 and a main source determination unit 123. These image window size control unit 122 and main source determination unit 123 are composed of, for example, programs operating on a CPU of the control unit 120. The configurations of the image window size control unit 122 and main source determination unit 123 are not limited to this example, however, and one or both of the image window size control unit 122 and main source determination unit 123 may also be composed of dedicated hardware. The operations of the image window size control unit 122 and main source determination unit 123 will be described below.

For example, radio waves via ground-wave digital broadcasting are received by the antenna 101, converted into RF signals, and supplied to a tuner unit 102. The tuner unit 102 selects and demodulates signals in a specific frequency band from the RF signals supplied from the antenna 101, for example, in response to a user's operation to the operation unit 121, and restores MPEG2-TS. The restored MPEG2-TS, from which required packet is taken by a demultiplexer 103, is made into an elementary stream for MPEG2, which is supplied to a MPEG decoder 104.

Furthermore, in the demultiplexer 103, signals via data broadcasting, which are included in the received signals, are extracted and decoded. When still image data compressed and coded in a JPEG format (hereinafter, JPEG data) is included in the decoded data, the data is supplied to a JPEG decoder 110.

The MPEG decoder 104 decodes the elementary stream for MPEG2, which has been supplied from the demultiplexer 103, and outputs moving image data and sound data. The moving image data is supplied to a synthesizing unit 105, and also supplied to a signal characteristics acquisition unit 117 and a face detection unit 118. It is to be noted that the sound data is not particularly related to the present invention, and thus the illustration or description of the sound data will be omitted.

On the other hand, the image data generated as a file in the external device is input to an external connection terminal 106, and supplied to a format discrimination unit 107. As the external device, for example, digital still cameras and digital video cameras are conceivable. Common personal computers and storage devices using a hard disc as a storage medium can also be used as the external device. In these cases, the external connection terminal 106 corresponds to a predetermined interface such as a USB or an IEEE 1394. Alternatively, a removable nonvolatile memory such as a flash memory can be used. In this case, the external connection terminal 106 is composed of a connector corresponding to the memory and a driving circuit therefor.

Further, the external device may be a database, a server device, or the like connected to a network. In this case, the external connection terminal 106 should be an interface for carrying out a network connection with the use of TCP/IP or the like as a protocol. Furthermore, a storage medium such as a hard disk can be built into the video display apparatus 100, and image data can be supplied to the format discrimination unit 107 from this storage medium.

The format discrimination unit 107 identifies the format of the file supplied from the external connection terminal 106. The format can be identified, for example, based on the extension contained in the file name of the file. It is also possible to identify the format by analyzing the file header section. In the example of FIG. 1, the format discrimination unit 107 identifies which format the file has, from among a MPEG2 format, an AVI format, a JPEG format and a RAW format. The result of this format discrimination is supplied to the control unit 120 as file format information, and passed to the main source determination unit 123.

The file which has been determined to be a file in the MPEG2 format in the format discrimination unit 107 is supplied to a MPEG decoder 108. The file which has been determined to be a file in the AVI format is supplied to an AVI decoder 109. The file which has been determined to have the JPEG format is supplied to a JPEG decoder 110. The file which has been determined to have the RAW format is supplied to a RAW developing unit 111.

The MPEG decoder 108 decodes the MPEG2 data stored in the supplied file, and outputs the decoded MPEG2 data as moving image data. The moving image data output from the MPEG decoder is supplied to the synthesizing unit 105, and is also supplied to the signal characteristics acquisition unit 117 and the face detection unit 118.

The AVI decoder 109 analyses the supplied file, and determines whether or not the data stored in the AVI file can be decoded. If it is determined that the AVI file can be decoded, the AVI decoder 109 decodes the data stored in the file and outputs the decoded data as moving image data. The moving image data output from the AVI decoder 109 is supplied to the synthesizing unit 105, and is also supplied to the signal characteristics acquisition unit 117 and the face detection unit 118.

The JPEG decoder 110 decodes the data stored in the supplied file, and outputs the decoded data as bitmap still image data. The still image data output from the JPEG decoder 110 is supplied to the synthesizing unit 105, and is also supplied to the signal characteristics acquisition unit 117 and the face detection unit 118.

The RAW developing unit 111 develops the RAW data stored in the supplied file, and outputs the developed RAW data as bitmap still image data. The still image data output from the RAW developing unit 111 is supplied to the synthesizing unit 105, and is also supplied to the face detection unit 118.

The signal characteristics acquisition unit 117 acquires the signal characteristics of the image data supplied from the MPEG decoder 104, the MPEG decoder 108, the AVI decoder 109, and the JPEG decoder 110. The signal characteristics acquisition unit 117 outputs signal characteristics of image data determined to be a main source, depending on main source information supplied from the main source determination unit 123 described below.

For example, if the image data output from the MPEG decoder 108 is determined to be a main source from the main source information, the signal characteristics acquisition unit 117 outputs the signal characteristics of the image data supplied from the MPEG decoder 104. On the other hand, in a case in which the image data output from the RAW developing unit 111 is determined to be a main source, the signal characteristics acquisition unit 117, for example, does not output any signal characteristics.

The operation of acquiring signal characteristics by the signal characteristics acquisition unit 117 is carried out at a predetermined interval, such as for each frame, for several frames, or for several tens of frames, for example, based on the frame timing of the image data supplied from the MPEG decoder 104. For example, the signal characteristics acquisition unit 117 extracts and analyzes a luminance component and a color component from the supplied image data to acquire the luminance characteristics and color characteristics of the image data. Or, for example, the signal characteristics acquisition unit 117 carries out edge detection for the supplied image data to acquire edge information. It is to be noted that these luminance characteristics, color characteristics, and edge information are examples of the signal characteristics of the images, and the signal characteristics of the images are not limited to the examples.

The face detection unit 118 detects face images included in the image data, for each piece of the image data supplied from the MPEG decoder 104, the MPEG decoder 108, the AVI decoder 109, the JPEG decoder 110, and the RAW developing unit 111. Then, the face detection unit 110 obtains the area SFx of the display area in which the face image is displayed in the image of the image data, and supplies the obtained area SFx of the display area to the main source determination unit 123.

It is to be noted that known face detection techniques can be utilized for the face detection in the present embodiment. Known face detection techniques include a learning-based approach utilizing a neural network or the like, and an approach in which template matching is used to search a distinctive site in shape, such as an eye, a nose, and a mouth, from an image, and deem the site a face if the degree of similarity is high. In addition, many approaches have been proposed, such as detecting the image feature quantity such as skin color and eye shape and using statistical analysis. In general, two or more of these approaches are synthesized to improve the accuracy of focus detection. Specific examples include a method of utilizing the wavelet transform described in Japanese Patent Laid-Open No. 2002-251380 and the image feature quantity to carry out face detection.

The file determined to have the JPEG format or the RAW format in the format discrimination unit 107 is also supplied to a photo information acquisition unit 113. The photo information acquisition unit 113 determines whether or not photo information is contained in the supplied file, and if it is determined that photo information is contained in the supplied file, the photo information acquisition unit 113 extracts the photo information from the file and supplies the extracted photo information to the main source determination unit 123 and the video processing unit 114 described below. If it is determined that photo information is not contained in the supplied file, the photo information acquisition unit 113 notifies the control unit 120 of that determination.

For example, the photo information acquisition unit 113 checks whether or not the supplied file has Exif (Exchangeable Image File Format) data. If the file has Exif data, the photo information acquisition unit 113 extracts from the file various pieces of information at the time of photographing. The photo information extracted from the file can include the date of photographing, shutter speed, aperture ratio, ISO information, exposure information, white balance, and flash intensity. Files in the RAW format generally have Exif data. Files in the JPEG format have Exif information if the file is generated in photographing with an Exif-compatible digital still camera or the like. The extracted photo information is supplied to the video processing unit 114 and the main source determination unit 123 in the control unit 120.

The synthesizing unit 105 arranges, on the basis of control exercised by the control unit 120, the image data supplied from the MPEG decoders 104 and 108, the AVI decoder 109, the JPEG decoder 110, and the RAW developing unit 111 on one screen, and synthesizes the image data into one image. Then, the synthesizing unit 105 outputs the synthesized image data. As the method for the image synthesis, a variety of methods are conceivable. As an example, a method can be used in which the supplied image data is held in a memory (not shown) of the synthesizing unit 105, and read out from the memory at timings in accordance with the arrangement positions. However, the method for the image synthesis is not limited to this example, and it is also conceivable to synthesize images with the use of multiple plane memories.

It is to be noted that, for still image data supplied from the JPEG decoder 110 and the RAW developing unit 111, multiple pieces of image data from the same source can be displayed on one screen by utilizing a memory, not shown, of the synthesizing unit 105. As for moving image data, there is a one-to-one relation between an image displayed on a screen and the source of the image.

For example, the control unit 120 selects sources for supplying image data to be displayed simultaneously on one screen from multiple sources for supplying image data to the synthesizing unit 105, in response to an operation to the operation unit 121. In the example of FIG. 1, the sources of image data for the synthesizing unit 105 are the MPEG decoders 104 and 108, the AVI decoder 109, the JPEG decoder 110, and the RAW developing unit 111. As the sources of the image data to be displayed simultaneously on one screen, multiple sources can be selected.

The display size for the image of each piece of image data synthesized in the synthesizing unit 105 can be changed in response to an operation to the operation unit 121. As an example, the user carries out an operation using the operation unit 121 for selecting an image to be changed in display size from multiple images displayed on the display unit 116. The control signal in accordance with this operation is output from the operation unit 121 and passed to the control unit 120, and the control unit 120 notifies the synthesizing unit 105 of image data to be changed in display size. Next, when an operation for changing the display size of the selected image is carried out, the control signal in accordance with this operation is supplied to the control unit 120 and passed to the image window size control unit 122.

The image window size control unit 122 determines, in response to this control signal, the display size of the target image, and orders the synthesizing unit 105 to change the display size of the target image to this determined display size. The synthesizing unit 105 applies zooming to the target image to change the display size of the image, in response to this request.

Furthermore, the image window size control unit 122 determines the display area Sx of the target image data, on the basis of the determined display size. The information indicating this display area Sx is also supplied to the main source determination unit 123. In addition to this display area Sx, as described above, photo information from the photo information acquisition unit 113, file format information from the format discrimination unit 107, as well as a face display area SFx from the face detection unit 118 are also supplied to the main source determination unit 123. The main source determination unit 123 determines, on the basis of this information, a main source that is referenced image data of image quality adjustment processing in the video processing unit 114 described below. The main source determination processing carried out by the main source determination unit 123 is described below. The main source information indicating the determined main source is supplied to the signal characteristics acquisition unit 117 and to the video processing unit 114.

An image quality adjustment value database 115 is connected to the video processing unit 114. The image quality adjustment value database 115 stores, in advance, signal characteristics information and photo information together with corresponding image quality adjustment values as parameters for image quality adjustment. In a case in which the image data determined as the main source has photo information, the video processing unit 114 refers to the image quality adjustment value database 115 and selects the image quality adjustment value on the basis of this photo information. Alternatively, in a case in which the image data determined as the main source has no photo information, the video processing unit 114 refers to the image quality adjustment value database 115 and selects an image quality adjustment value on the basis of the signal characteristics information supplied from the signal characteristics acquisition unit 117. Then, the video processing unit 114 carries out image quality adjustment processing for the synthesized image data supplied from the synthesizing unit 105 using the thus-selected image quality adjustment value as a parameter.

It is to be noted that the image quality adjustment carried out in the video processing unit 114 may be carried out in various ways. For example, processing of image data includes noise reduction processing, gamma correction processing, sharpness (edge enhancement) processing, and color (color tone) correction processing. Furthermore, when the display device of the display unit 116 is a device which requires a backlight, such as an LCD, the video processing unit 114 can carry out adjustment of the brightness of the backlight for the LCD, as image quality adjustment. In a dynamic mode, the processing described above is carried out in a dynamic manner, on the basis of the signal characteristics information supplied from the signal characteristics acquisition unit 117.

The image data output from the video processing unit 114 is supplied to the display unit 116. The display unit 116 is composed of, for example, a display device such as an LCD (Liquid Crystal Display) and a driving circuit for driving the display device.

Next, the main source determination method in the main source determination unit 123 according to the embodiment of the present invention is described. In the embodiment of the present invention, each piece of image data to be synthesized onto one screen in the synthesizing unit 105 is evaluated for multiple items to obtain an evaluation value for each piece of image data. Then, image data with the largest evaluation value is determined to be the main source, as image data with the highest degree of importance. The items for obtaining the evaluation values are, in the embodiment, the input port of the image data, the display area Sx, the photo information, the file format information, and the face display area SFx.

Figure 2:
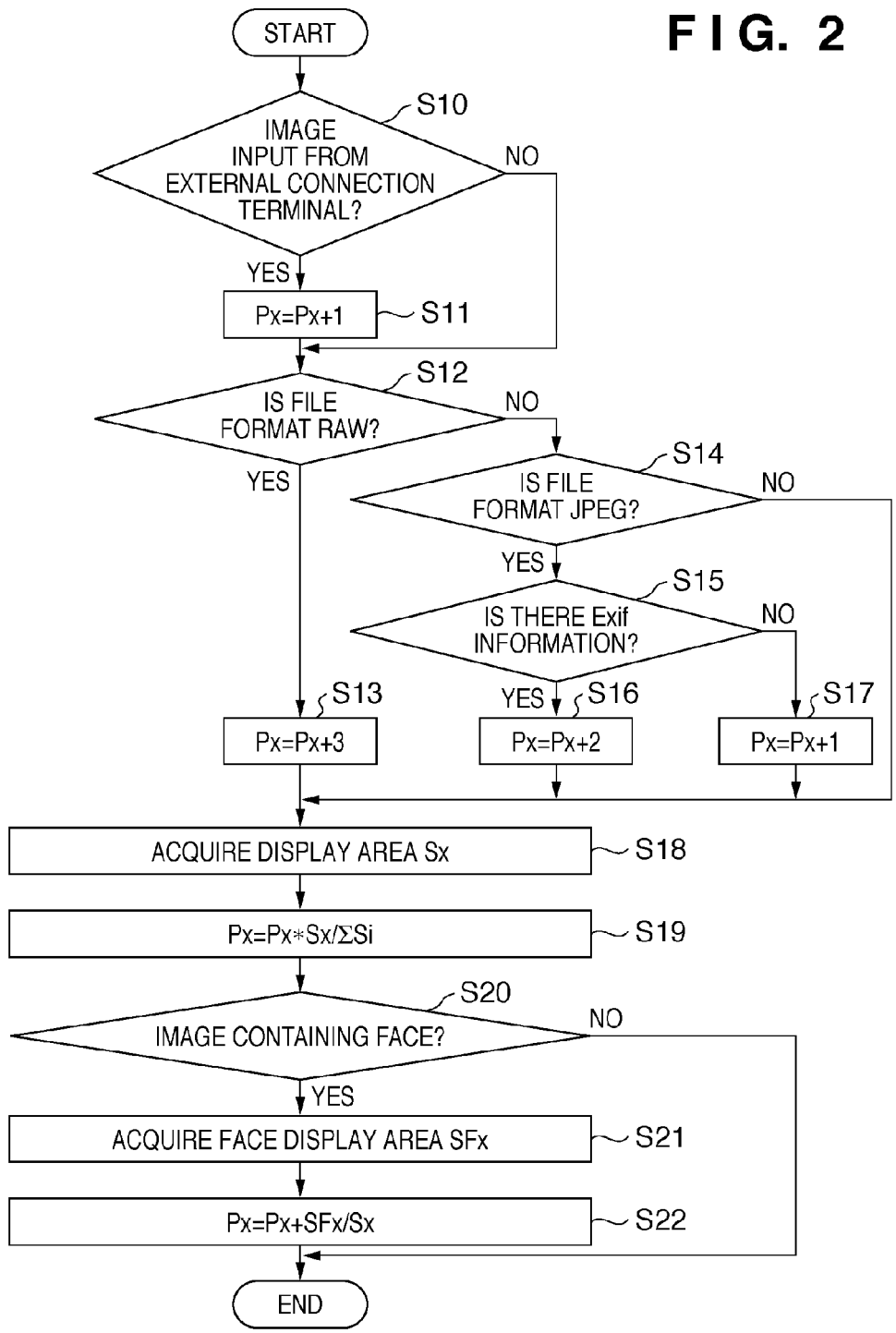
FIG. 2 is a flowchart which shows processing for obtaining an evaluation value for main source determination processing according to the embodiment of the present invention.

FIG. 2 is a flowchart which shows processing for obtaining an evaluation value, for example, main source determination processing, according to the embodiment of the present invention. Each process in the flowchart of FIG. 2 is executed by the main source determination unit 123. It is to be noted that the initial value of an evaluation value Px is set to be a value 1.

In step S10, it is determined whether or not image data to be evaluated is data input from the external connection terminal 106. This determination can be made by, for example, the control unit 120. If it is determined that the image data is not data input from the external connection terminal 106, the processing proceeds to step S12. On the other hand, if it is determined that the image data is data input from the external connection terminal 106, the processing proceeds to step S11 to add a value 1 to the evaluation value Px. Then, the processing proceeds to step S12.

In step S12 through step S17, the file format of the target image data is determined, and a value in accordance with the determination result is added to the evaluation value Px. In step S12, it is determined whether or not the file format of the image data in question is a RAW format, on the basis of file format information from the format discrimination unit 107. If it is determined that the file format is a RAW format, the processing proceeds to step S13. It is contemplated that the user requests watching an image of RAW data at high image quality. Thus, in step S13, a value 3 which is the largest value in the determination based on the file format information is added to the evaluation value Px to obtain a new evaluation value Px, and the processing proceeds to step S18.

On the other hand, if it is determined in step S12 that the file format is not a RAW format, the processing proceeds to step S14, in which it is determined whether or not the file format is a JPEG format, on the basis of the file format information from the format discrimination unit 107. If it is determined that the file format is a JPEG format, the processing proceeds to step S15.

In step S15, it is determined whether or not the JPEG file has photo information (Exif information in this case), on the basis of the output of the photo information acquisition unit 113. If it is determined that the JPEG file has photo information, the processing proceeds to step S16. It is contemplated that the user requests watching an image of JPEG data with photo information at high image quality. Thus, in step S16, a value 2 which is the second largest value in the determination based on the file format information is added to the evaluation value Px to obtain a new evaluation value Px.

On the other hand, if it is determined that the JPEG file has no photo information, the processing proceeds to step S17. An image of JPEG data extracted from data broadcasting is also determined as having no photo information. In step 17, a value 1 is added to the evaluation value Px to obtain a new evaluation value Px. After the corresponding value is added to the evaluation value Px in step S16 or step S17, the processing proceeds to step S18.

If it is determined in step S14 described above that the file format of the image data in question is not JPEG, no value is added to the evaluation value Px, and the processing proceeds to step S18.

As described above, in step S12 through step S17, a corresponding value is added to the evaluation value Px in accordance with the file format of the target image data. In this case, in a case in which the file format of the target image data indicates a file format which stores moving image data, no value is added to the evaluation value Px. This is because cases of watching still images rather than moving images at high image quality are assumed in the embodiment. The addition to the evaluation value Px for each file format may be appropriately determined depending on the intended use or the like of the apparatus.

The processing proceeds to step S18, in which the main source determination unit 123 acquires, from the image window size control unit 122, information indicating the display areas S0, S1, ..., Sx, ..., Sn of each piece of image data synthesized in the synthesizing unit 105. Then, in the next step S19, the main source determination unit 123 obtains the sum of the acquired display areas S0, S1, ..., Sx, ..., Sn of each image data, and obtains the ratio Rx of the display area Sx of the target image data to the sum of the display areas. A value obtained by multiplying the ratio Rx by the evaluation value Px is set as a new evaluation value Px.

This is expressed by the following formula (1) when the sum of the display areas for each piece of image data synthesized in the synthesizing unit 105 is expressed as ©Si.

$$Px=Px\times(Sx/©Si) \quad (1)$$

The processing proceeds to step S20, in which the main source determination unit 123 determines whether or not the target image data contains a face image, on the basis of the result of the face detection for the target image data carried out by the face detection unit 118. If it is determined that no face image is contained, the series of processes is ended to fix the evaluation value Px.

On the other hand, if it is determined in step S20 that the target image data contains a face image, the processing proceeds to step S21. In step S21, the main source determination unit 123 acquires, from the face detection unit 118, the face display area SFx obtained for the target image data. Then, in the next step S22, the main source determination unit 123 obtains the ratio RFx of the face display area SFx to the display area Sx of the target image data, to set, as a new evaluation value Px, the value obtained by adding the ratio RFx and the evaluation value Px. This new evaluation value Px is fixed as the final evaluation value Px for the target image data, and the series of processes is ended.

The processing in this step S22 is expressed by the following formula (2).

$$Px=Px+SFx/Sx \quad (2)$$

The processing in step S10 through step S22 described above is carried out for each piece of image data synthesized onto one screen in the synthesizing unit 105 to obtain each evaluation value Px. Then, the main source determination unit 123 compares the evaluation values Px of each piece of the image data, and determines, as the main source, image data with the evaluation value Px which takes the largest value.

The processing in step S10 through step S22 is carried out again to redetermine the main source, for example, in a case in which the display size of an image is changed by a user's operation to the operation unit 121, or in a case in which the image displayed through synthesis onto one screen is changed.

In a case in which the image data to be evaluated is moving image data, there is a possibility that no appropriate evaluation result is obtained when evaluation based on the detection result from the face detection unit 118 in step S20 through step S22 is carried out for a specific frame of the moving image data. However, it is possible to deal with this problem by carrying out face detection by the face detection unit 118 for multiple frames of the moving image data. For example, it is conceivable that face detection is carried out for each of multiple temporally continuous frames to use the average value of the face display areas SFx obtained for each frame. Alternatively, in a case in which the target image data is moving image data, it is also conceivable that evaluation based on face detection is not carried out.

The values added to the evaluation value Px in step S11, step S13, step S16, and step S17 described above are just examples, and are not limited thereto.

Furthermore, a case is also conceivable in which multiple pieces of image data have the largest evaluation value Px when the processing in accordance with the flowchart of FIG. 2 is applied to respective images to be synthesized onto one screen. In this case, among the multiple pieces of image data which have the largest evaluation value Px, for example, the image data most recently requested by the user to be displayed is conceivable as the main source.

Figure 3:
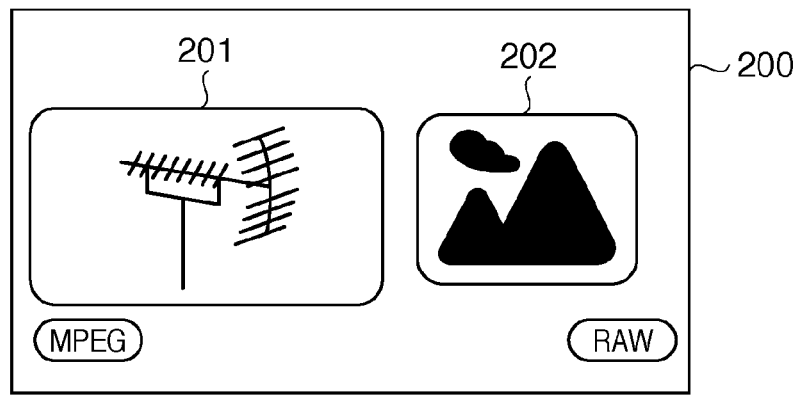
FIG. 3 is a diagram for more specifically explaining main source determination processing according to the embodiment of the present invention.

The processing described above in the flowchart of FIG. 2 is now described with reference to more specific examples. FIG. 3 is an example in which an image 201 via TV broadcasting, supplied from the MPEG decoder 104, and an image 202 based on image data in RAW format, input from the external connection terminal 106, are synthesized and displayed on a display screen 200 of the display unit 116.

The image 201 has the evaluation value Px=1 at this stage, since no value is added to the evaluation value Px in step S10, step S11, and step S12 through step S17 of FIG. 2. In step S18 and step S19, when the display area Sa of the image 201 and the display area Sb of the image 202 have a ratio of Sa:Sb=2:1, the evaluation value Px will be Px=1×2/(2+1)≈0.67. Then, in step S20 through step S22, since no face image is contained in the image 201, the evaluation value Px of the image 201 is fixed at Px≈0.67.

On the other hand, the image 202 has the evaluation value Px=5 at this stage, since a value 1 is added to the evaluation value Px in step S10 and step S11 of FIG. 2, and a value 3 is further added to the evaluation value Px in step S12 through step S17. In step S18 and step S19, the evaluation value Px will be Px=5×1/(1+2)≈1.67 on the basis of the display area ratio of the image 201 to the image 202. Then, in step S20 through step S22, since no face image is contained in the image 202, the evaluation value Px of the image 202 is fixed at Px≈1.67.

Comparing the evaluation values Px of the image 201 and the image 202, the evaluation value Px of the image 202 is larger than that of the image 201. Thus, the main source in the display screen 200 of FIG. 3 is determined to be the image data in the RAW format for displaying the image 202. The video processing unit 114 acquires, from the photo information acquisition unit 113, photo information attached to the image data in the RAW format. Then, on the basis of this acquired photo information, the video processing unit 114 references the image quality adjustment value database 115, selects an image quality adjustment value, and carries out image quality adjustment of image data output from the synthesizing unit 105 with the use of the selected image quality adjustment value. The image data on which the image quality adjustment has been carried out is supplied to the display unit 116, and, for example, the display screen 200 as described above in FIG. 3 is displayed.

Figure 4:
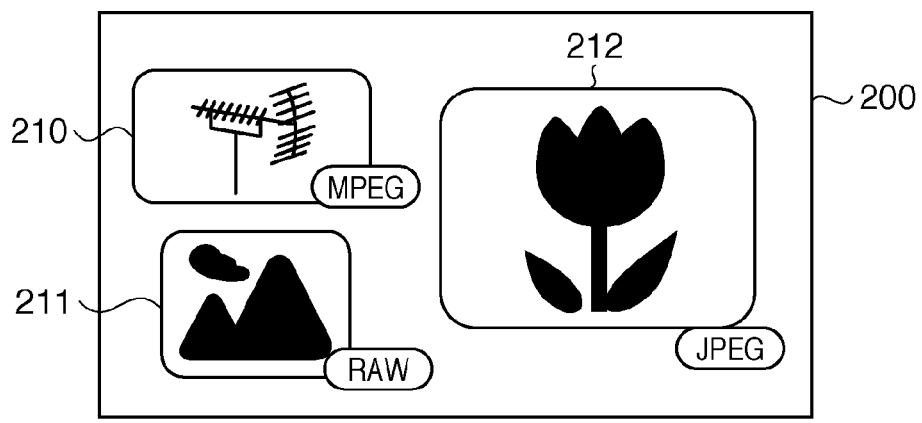
FIG. 4 is a diagram for more specifically explaining main source determination processing according to the embodiment of the present invention.

FIG. 4 is an example in which three images consisting of an image 210, an image 211, and an image 212 are synthesized and displayed on the display screen 200 of the display unit 116. The image 210 is an image via TV broadcasting supplied from the MPEG decoder 104, the image 211 is the image 202 based on the image data in the RAW format input from the external connection terminal 106, and the image 212 is an image based on image data in a JPEG format with Exif information input from the external connection terminal 106.

The image 210 has the evaluation value Px=1 at this stage, since no value is added to the evaluation value Px in step S10, step S11, and step S12 through step S17 of FIG. 2. In step S18 and step S19, the display area Sa of the image 210, the display area Sb of the image 211, the display area Sc of the image 212 have a ratio of Sa:Sb:Sc=1:1:2. In this case, the evaluation value Px will be Px=1×1/(1+1+2)=0.25. Then, in step S20 through step S22, since no face image is contained in the image 210, the evaluation value Px of the image 210 is fixed at Px=0.25.

The image 211 has the evaluation value Px=5 at this stage, since a value 1 is added to the evaluation value Px in step S10 and step S11 of FIG. 2, and a value 3 is further added to the evaluation value Px in step S12 through step S17. In step S18 and step S19, the evaluation value Px will be Px=5×1/(1+1+2)=1.25 on the basis of the display area ratio of the image 210, the image 211, and the image 212. Then, in step S20 through step S22, since no face image is contained in the image 211, the evaluation value Px of the image 211 is fixed at Px=1.25.

Furthermore, the image 212 has the evaluation value Px=4 at this stage, since a value 1 is added to the evaluation value Px in step S10 and step S11 of FIG. 2, and a value 2 is further added to the evaluation value Px in step S12 through step S17. In step S18 and step S19, the evaluation value Px will be Px=4×2/(1+1+2)=2 on the basis of the display area ratio of the image 210, the image 211, and the image 212. Then, in step S20 through step S22, since no face image is contained in the image 212, the evaluation value Px of the image 212 is fixed at Px=2.

Comparing the evaluation values Px of the image 210, the image 211, and the image 212, the image 212 has the largest evaluation value Px. Thus, the main source in the display screen 200 of FIG. 4 is determined to be the image data in the JPEG format for displaying the image 212. The video processing unit 114 acquires, from the photo information acquisition unit 113, photo information attached to the image data in the JPEG format. Then, on the basis of this acquired photo information, the video processing unit 114 references the image quality adjustment value database 115, selects an image quality adjustment value, and carries out image quality adjustment on image data output from the synthesizing unit 105 with the use of the selected image quality adjustment value. The image data on which the image quality adjustment has been carried out is supplied to the display unit 116, and, for example, the display screen 200 as described above in FIG. 4 is displayed.

Figure 5:
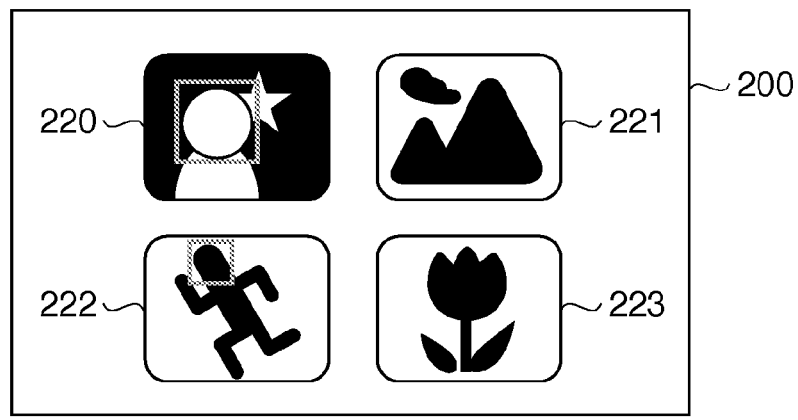
FIG. 5 is a diagram for more specifically explaining example main source determination processing according to the embodiment of the present invention.

FIG. 5 is an example in which four images, an image 220, an image 221, an image 222, and an image 223, are synthesized and displayed on a display screen 200 of the display unit 116, where each image is based on image data in a RAW format input from the external connection terminal 106. Furthermore, it is assumed that the image 220, the image 221, the image 222, and the image 223 are all equal in display area in the display screen 200. Moreover, it is assumed that a face image is contained in each of the image 220 and the image 222. The ranges of the face images are indicated by frames in the image 220 and the image 222.

In the example of FIG. 5, the image 220, the image 221, the image 222, and the image 223 all have the same file format and display area. The evaluation values Px obtained in step S10 up to step S19 of FIG. 2 are equal to each other, and more specifically, the evaluation value Px of each of the image 220, the image 221, the image 222, and the image 223 at this stage will be Px=5×1/(1+1+1+1)=1.25.

In step S20 through step S22, since no face image is contained either in the image 221 or the image 223, the evaluation value Px of each of the image 221 and the image 223 is fixed at Px=1.25.

On the other hand, the evaluation values Px of the image 220 and image 222 containing face images are obtained on the basis of the ratio RFx of the face display area SFx to the display area Sx of the image. In the case of the ratio RFx=SFx/Sx=0.3 in the image 220 and the ratio RFx=SFx/Sx=0.1 in the image 222, the evaluation value Px of the image 220 is fixed at Px=1.25+0.3=1.55, whereas the evaluation value Px of the image 222 is fixed at Px=1.25+0.1=1.35.

Comparing the thus-obtained evaluation values Px of the image 220, the image 221, the image 222, and the image 223, the image 220 has the largest evaluation value Px of 1.55. Thus, the main source in the display screen 200 of FIG. 5 is determined to be the image data in the RAW format for displaying the image 220. The video processing unit 114 acquires, from the photo information acquisition unit 113, photo information attached to the image data in the RAW format. Then, on the basis of this acquired photo information, the video processing unit 114 references the image quality adjustment value database 115, selects an image quality adjustment value, and carries out image quality adjustment on image data output from the synthesizing unit 105 with the use of the selected image quality adjustment value. The image data on which the image quality adjustment has been carried out is supplied to the display unit 116, and, for example, the display screen 200 as described above in FIG. 5 is displayed.

As described above, according to the embodiment of the present invention, when multiple images are synthesized and displayed onto one screen, the main source is determined on the basis of the file format of the image data, whether or not the image data has photo information, and the ratio of the area of the face image contained in the image to the display area of the image. Then, image quality adjustment is applied to the image of the determined main source by a method which is suitable for the image of the main source. Therefore, among the multiple images to be synthesized and displayed onto one screen, optimum image quality adjustment is applied preferentially to the image which is believed to be highly important.

It is to be noted that, in the embodiment described above, the main source is determined on the basis of the information regarding the input source of the image data, the file format, the presence or absence of photo information, the window size of the displayed image, and the size of the face display area. However, not necessarily all of the above-mentioned information is used to obtain the evaluation value Px, and the evaluation value Px may be obtained on the basis of at least one type of information from the above-mentioned information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-152254, filed Jun. 10, 2008, which is hereby incorporated by reference herein in its entirety.

What is claimed is:

1. A display control apparatus comprising:
a processor; and
a memory coupled to the processor to store instructions that cause the processor to perform operations of at least one of a plurality of units of the display control apparatus including:
a synthesizing unit configured to synthesize a plurality of image data to generate synthesized image data;
an image quality adjustment unit configured to carry out image quality adjustment for the synthesized image data output from the synthesizing unit;
a format discrimination unit configured to discriminate a format of each of the plurality of image data;
a determination unit configured to determine referenced image data for the image quality adjustment among the plurality of image data based on discrimination results in the format discrimination unit;
a control unit configured to control the image quality adjustment unit so as to carry out the image quality adjustment for the synthesized image data using an image quality adjustment parameter suitable for the referenced image data determined by the determination unit; and
a face detection unit configured to carry out face detection for each of the plurality of image data,
wherein the determination unit determines the referenced image data for the image quality adjustment by further using the detection result in the face detection unit.

2. The display control apparatus according to claim 1, further comprising a window size discrimination unit configured to discriminate a window size of a displayed image for each of the plurality of image data,
wherein the determination unit determines the referenced image data for the image quality adjustment by further using the discrimination result in the window size discrimination unit.

3. A display control apparatus comprising:
a synthesizing unit configured to synthesize a plurality of image data to generate synthesized image data;
an image quality adjustment unit configured to carry out image quality adjustment for the synthesized image data output from the synthesizing unit;
a format discrimination unit configured to discriminate a format of each of the plurality of image data;
a determination unit configured to determine referenced image data for the image quality adjustment among the plurality of image data based on discrimination results in the format discrimination unit;
a control unit configured to control the image quality adjustment unit so as to carry out the image quality adjustment for the synthesized image data using an image quality adjustment parameter suitable for the referenced image data determined by the determination unit; and
a data format discrimination unit configured to discriminate whether or not the image data is input as a file,
wherein the determination unit determines the referenced image data for the image quality adjustment by further using the discrimination result in the data format discrimination unit.

4. A display control apparatus comprising:
a synthesizing unit configured to synthesize a plurality of image data to generate synthesized image data;
an image quality adjustment unit configured to carry out image quality adjustment for the synthesized image data output from the synthesizing unit;
a format discrimination unit configured to discriminate a format of each of the plurality of image data;
a determination unit configured to determine referenced image data for the image quality adjustment among the plurality of image data based on discrimination results in the format discrimination unit;
a control unit configured to control the image quality adjustment unit so as to carry out the image quality adjustment for the synthesized image data using an image quality adjustment parameter suitable for the referenced image data determined by the determination unit;
a photo information acquisition unit configured to acquire photo information from the image data; and
a signal characteristics acquisition unit configured to acquire signal characteristics of the image data,
wherein, when the format discrimination unit determines that the referenced image data for the image quality adjustment has a format of image data with the photo information, the control unit controls the image quality adjustment unit so as to carry out the image quality adjustment with a parameter based on the photo information acquired from the image data by the photo information acquisition unit, and
when the format discrimination unit determines that the referenced image data for the image quality adjustment has a format of image data without photo information, the control unit controls the image quality adjustment unit so as to carry out the image quality adjustment with a parameter based on the signal characteristics acquired from the image data by the signal characteristics acquisition unit.

5. A display control method comprising:
a synthesizing step of synthesizing multiple pieces a plurality of image data to generate synthesized image data;
an image quality adjustment step of carrying out image quality adjustment for the synthesized image data;
a format discrimination step of discriminating a format of each of the plurality of image data;
a determination step of determining referenced image data for the image quality adjustment among the plurality of image data based on discrimination results in the format discrimination step;
a control step of controlling the image quality adjustment so as to carry out the image quality adjustment for the synthesized image data using an image quality adjustment parameter suitable for the referenced image data determined in the determination step; and
a face detection step of carrying out face detection for each of the plurality of image data,
wherein the determination step determines the referenced image data for the image quality adjustment by further using the detection result of the face detection step.

6. The display control method according to claim 5, further comprising a window size discrimination step of discriminating a window size of a displayed image for each of the plurality of image data,
wherein the determination step determines the referenced image data for the image quality adjustment by further using the discrimination result in the window size discrimination unit.

7. A display control method comprising:
a synthesizing step of synthesizing a plurality of image data to generate synthesized image data;
an image quality adjustment step of carrying out image quality adjustment for the synthesized image data;
a format discrimination step of discriminating a format of each of the plurality of image data;
a determination step of determining referenced image data for the image quality adjustment among the plurality of image data based on discrimination results in the format discrimination step;
a control step of controlling the image quality adjustment so as to carry out the image quality adjustment for the synthesized image data using an image quality adjustment parameter suitable for the referenced image data determined in the determination step; and
a data format discrimination step of discriminating whether or not the image data is input as a file,
wherein the determination step determines the referenced image data for the image quality adjustment by further using the discrimination result of the data format discrimination step.

8. A display control method comprising:
a synthesizing step of synthesizing a plurality of image data to generate synthesized image data;
an image quality adjustment step of carrying out image quality adjustment for the synthesized image data;
a format discrimination step of discriminating a format of each of the plurality of image data;
a determination step of determining referenced image data for the image quality adjustment among the plurality of image data based on discrimination results in the format discrimination step;
a control step of controlling the image quality adjustment so as to carry out the image quality adjustment for the synthesized image data using an image quality adjustment parameter suitable for the referenced image data determined in the determination step;
a photo information acquisition step of acquiring photo information from the image data; and
a signal characteristics acquisition step of acquiring signal characteristics of the image data,
wherein, when the format discrimination step determines that the referenced image data for the image quality adjustment has a format of image data with the photo information, the control step controls the image quality adjustment step so as to carry out the image quality adjustment with a parameter based on the photo information acquired from the image data in the photo information acquisition step, and
when the format discrimination step determines that the referenced image data for the image quality adjustment has a format of image data without photo information, the control step controls the image quality adjustment step so as to carry out the image quality adjustment with a parameter based on the signal characteristics acquired from the image data in the signal characteristics acquisition step.

* * * * *